Figure 1:
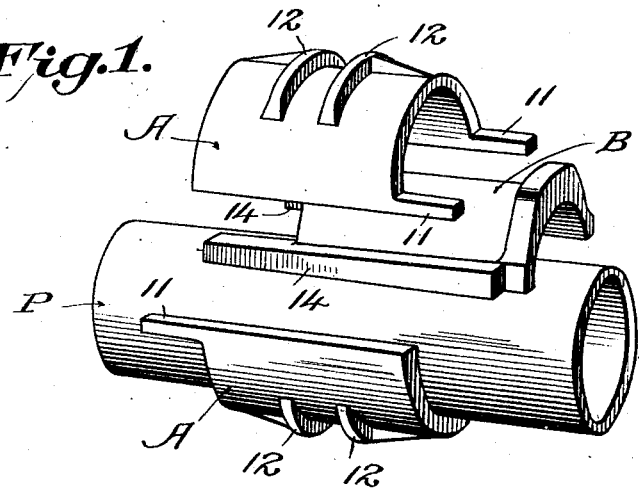

Sept. 1, 1931.  P. W. DIETER  1,821,295

PIPE ANCHOR AND CLAMP

Filed Feb. 17, 1930

Inventor
Paul W. Dieter,

WITNESSES:—

Patented Sept. 1, 1931

1,821,295

UNITED STATES PATENT OFFICE

PAUL W. DIETER, OF NEW YORK, N. Y.

PIPE ANCHOR AND CLAMP

Application filed February 17, 1930. Serial No. 429,139.

This invention relates to pipe anchor or clamp devices of the general type described and claimed in my copending prior application, Serial No. 405,248, and has for its general object to provide desirable improvements in such devices to the end of facilitating their application to pipes and of enabling their use in instances where a plate, wall or the like through which a pipe extends prevents access being had to more than one end of the device.

The present device is inclusive of a pair of shoes which are adapted to embrace a pipe where it passes through an opening in a wall, plate or the like, and these shoes are adapted to be forced apart, by a wedge device inserted between the pipe and one of the shoes, into engagement with the sides of the hole to secure the pipe against movement. In many instances access may be had to the pipe and to the clamp device at one side only of the plate or wall. Moreover, the wedge must be locked in a shoe spreading position after it has been actuated to force the shoes apart, and it is therefore an important object of the invention to provide means accessible from the same side of the plate, wall or the like from which the shoes and the wedge are inserted into the hole, for locking the wedge in a shoe spreading, pipe clamping position.

With the further object in view of providing a pipe anchor or clamp device possessed of the foregoing improvements and which retains all of the advantages of my prior device, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 2:
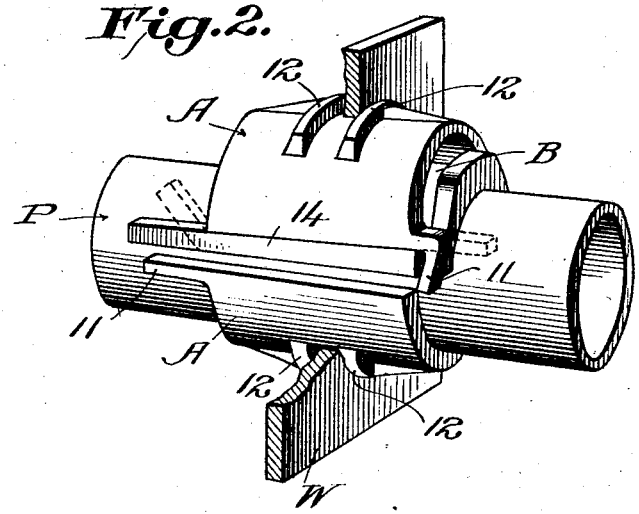

Figure 1 is a perspective view illustrating the parts of the present pipe anchor or clamp device in separated relation; and Figure 2 is a perspective view illustrating the parts of the device in operative position securing a pipe within a hole in a wall plate or the plate.

Referring to the drawings in detail, P designates a pipe and W a wall, plate or the like having a hole therein through which said pipe extends, and, as is understood, the purpose of the present device is to secure the pipe P against movement relative to the wall W.

According to the embodiment of the invention shown in the accompanying drawings, the present device consists of only three parts; viz., a pair of shoes A, A, and a wedge B, the shoes A, A preferably being duplicates of one another.

Each shoe consists of a member of any suitable length and of substantially semi-circular cross section, having a lug or lugs 11 projecting from one end thereof and provided on its outer face with a pair of longitudinally spaced stop formations or lugs 12, 12. Preferably two lugs 11 are provided and these extend longitudinally from the end of the shoe at points adjacent to the respective side edges thereof.

The wedge B also is of substantially semi-circular cross section and preferably is of the same or approximately of the same length as the shoes A. Along its side edges are formed outwardly directed flanges 14, 14 which preferably extend beyond the end of the wedge opposite to the driving end thereof and gradually increase in thickness towards the driving end of the wedge.

In the use of the device, the shoes A are engaged with opposite sides of the pipe P and inserted into the hole in the wall W with their lugs or stop formations 12, 12 disposed, respectively, to opposite sides of the wall. The wedge B then is inserted between the pipe P and one of the shoes A with its flanges 14, 14 engaging the side edges of said shoe. It is then driven inward to force said shoe away from the pipe and into engagement with the side of the hole in the wall until the outer faces of both shoes seat firmly against the sides of the hole and the pipe is clamped firmly between the wedge and the shoe opposite same. Then, to lock the wedge in its shoe-spreading, pipe-clamping position, the projecting end or ends of one or both of the flanges 14 may be bent against the end of the shoe A with which the wedge directly cooperates, as shown by dotted lines in Fig. 2, or, if the wall W prevents access being had to the projecting end portions of said flanges, one or both of the lugs 11 may be bent to overlie a suitable portion of the driving end of the wedge, as shown by full lines in Fig. 12. In either event, the wedge manifestly is securely and positively locked against accidental displacement from its operative position between the pipe and the shoe. Thus, the pipe is clamped securely by the shoes, and by reason of the lugs 12, 12 of the latter engaging opposite sides of the wall W, the clamping device and the pipe are held against longitudinal movement.

It will be understood of course that while a wall W has been illustrated having an opening therein through which the pipe P passes, the present device is adapted for use with equal facility and effectiveness in instances where the pipe P extends between any pair of fixed elements such, for example, as a pair of frame members. Furthermore, by reason of the shoes A being duplicates of one another they may be arranged in endwise reversed relation so that the wedge B may be inserted and locked from either end of the device.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A pipe clampig device comprising a pair of interchangeable anchoring members having bendable locking lugs formed from adjacent edges thereof, and a wedge member having laterally projecting flanges adapted to engage with the edges of one of the anchoring members to move the parts into gripping relation, and bendable locking tongues formed from the ends of the laterally projecting flanges of the wedge member, said locking lugs on the wedge member being adapted to be positioned reversely to the bendable locking lugs of the adjacent anchoring member, whereby when the parts are moved into gripping relation the bendable lugs of the wedge member may be bent into locking relation to the end of the adjacent anchoring member and likewise the bendable lugs of the anchoring member may be bent into engagement with the wedge member.

2. A pipe clamping device comprising an anchoring member adapted to cooperate with a support, a wedge adapted to be driven between the pipe and said anchoring member, and means on the anchoring member arranged on the side from which the wedge is driven adapted to be bent into locking engagement with the wedge when the same has been driven in place.

3. A pipe clamping device comprising a pair of anchoring members adapted to engage with a support, a wedge adapted to be slidably driven into position between the pipe and one of the anchoring members, and means associated with one of the anchoring members at the end thereof from which the wedge is driven and adapted to be moved into locking engagement with the head of the wedge to prevent its removal.

In testimony whereof I hereunto affix my signature.

PAUL W. DIETER.